Feb. 21, 1956 G. H. ATHERTON 2,735,266
COMBINATION APPARATUS FOR PRODUCING POWER FROM WOOD WASTE
Filed Jan. 14, 1952 3 Sheets-Sheet 1

INVENTOR.
GEORGE H. ATHERTON
BY
Buckhorn and Cheatham
ATTORNEYS

Feb. 21, 1956     G. H. ATHERTON     2,735,266
COMBINATION APPARATUS FOR PRODUCING POWER FROM WOOD WASTE
Filed Jan. 14, 1952     3 Sheets-Sheet 2

INVENTOR.
GEORGE H. ATHERTON
BY
*Buckhorn and Cheatham*
ATTORNEYS

Feb. 21, 1956   G. H. ATHERTON   2,735,266
COMBINATION APPARATUS FOR PRODUCING POWER FROM WOOD WASTE
Filed Jan. 14, 1952   3 Sheets-Sheet 3

GEORGE H. ATHERTON
INVENTOR.

BY Buckhorn and Cheatham

ATTORNEYS

United States Patent Office 2,735,266
Patented Feb. 21, 1956

2,735,266

COMBINATION APPARATUS FOR PRODUCING POWER FROM WOOD WASTE

George H. Atherton, Corvallis, Oreg., assignor to the State of Oregon, acting by and through the State Board of Forestry Application January 14, 1952, Serial No. 266,329

1 Claim. (Cl. 60—39.12)

This invention relates to a power producing gas turbine unit and more particularly to a portable, self-contained power plant unit for converting wood waste to electrical energy.

The lumbering industry is notorious for the amount of waste incurred in transforming a tree to the finished product, for example, the tremendous amounts of sawdust and scrap pieces evolved and of which little use is made, especially in the smaller operations carried on in the forests themselves away from large centers of population. With very few exceptions, a lumber mill includes as a standard piece of equipment a unit for simply burning the sawdust and the waste scraps of lumber to prevent the accumulation of unwieldy amounts thereof. Naturally, to the end of conserving our resources, it would be of interest to find some way of utilizing this refuse material. Some is being utilized today as a source of domestic heat, and a few commercial installations burn wood refuse in their heating plants. However, it is not generally economically feasible to use wood refuse for these purposes except where the haulage from the source to the point of consumption is very short, for with any but a very short haul the cost of the heat unit derived from the wood refuse loses its economic advantage over heat obtained from other fuels such as coal and oil.

Modern methods of logging and lumbering require considerable amounts of power, but, unfortunately, it is not frequent that an established source of power is available, especially for the smaller operations, such as portable mills, in remote areas which move from time to time as the supply of timber is cut from a given area. The large amount of wood refuse accumulated in these operations makes it tempting, of course, to devise some means of utilizing this refuse as a source of power, and some efforts have been made to this end by building wood-burning steam generating plants. While wood-burning steam plants of large size may be made relatively efficient, small plants having an output sufficient to run a lumber mill are relatively expensive and relatively inefficient installatitons and, furthermore, are not adapted for mobility. Since it is advantageous to move the lumber mill close to the scene of the logging operations, it would be preferable to have a power unit which is likewise mobile. Accordingly, it is an object of this invention to provide a relatively mobile unit for obtaining power from the combustion of wood refuse.

It is a further object of the present invention to provide an efficient unit for producing useful power from wood refuse. More particularly, it is an object of the present invention to provide an efficient gas turbine power unit driven by gases derived from the burning of wood refuse.

It is another object of the present invention to provide an improved combustion system for the burning of wood refuse.

It is still another object of the present invention to provide a new and improved furnace for the combustion of wood refuse having a high moisture content.

Other objects of the invention will appear hereinafter.

In accordance with an illustrated embodiment of my invention, there is provided a wood-fired, gas turbine power unit having a new and improved combustion system operating under pressure for efficiently burning wood refuse. The combustion system includes a primary chamber into which a fuel such as sawdust, hogged wood, chips and the like, is initially fed to be burned on a unique fuel supporting arrangement. The gaseous products derived from this chamber include a considerable percentage of combustible gases and are conducted to a secondary combustion chamber designed to aid in the complete combustion of these gases which are then used to drive a gas turbine from which useful power can be obtained by well-known means. For a more complete explanation of the invention, reference is made to the drawings wherein:

Figure 1:
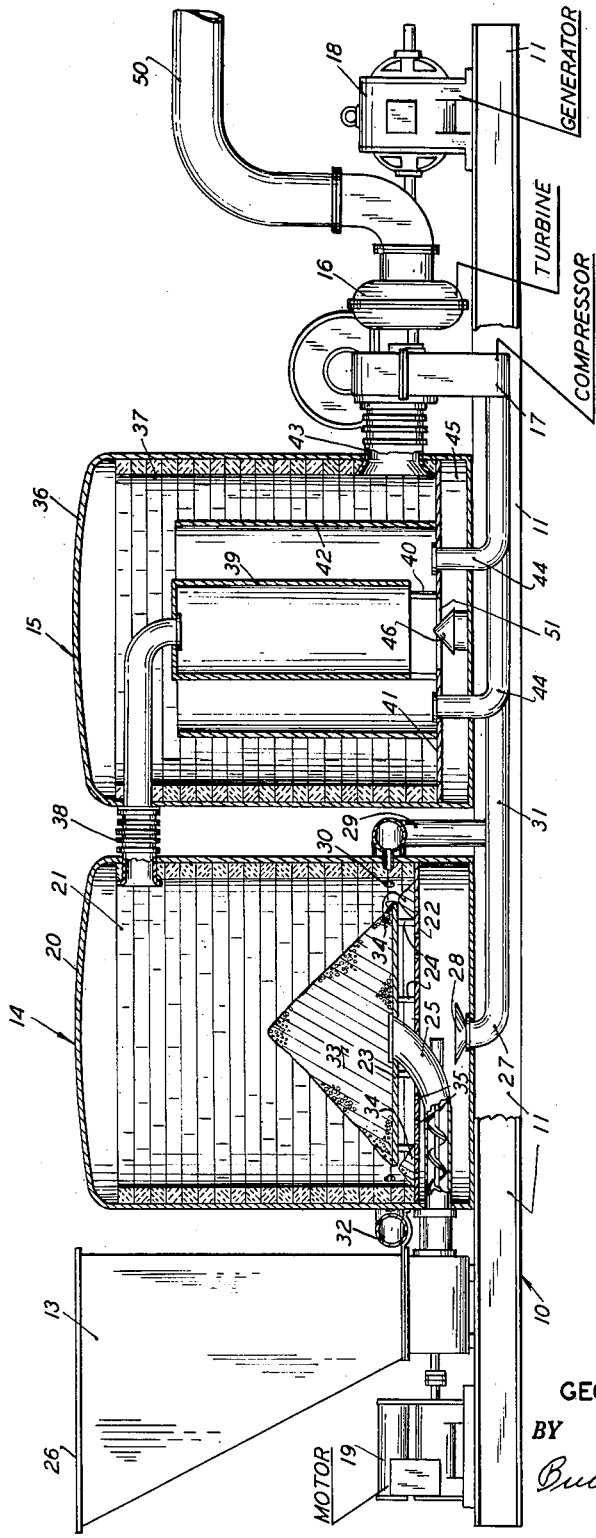
Fig. 1 is a side elevation, partly broken away, of the power unit of this invention.
Figure 2:
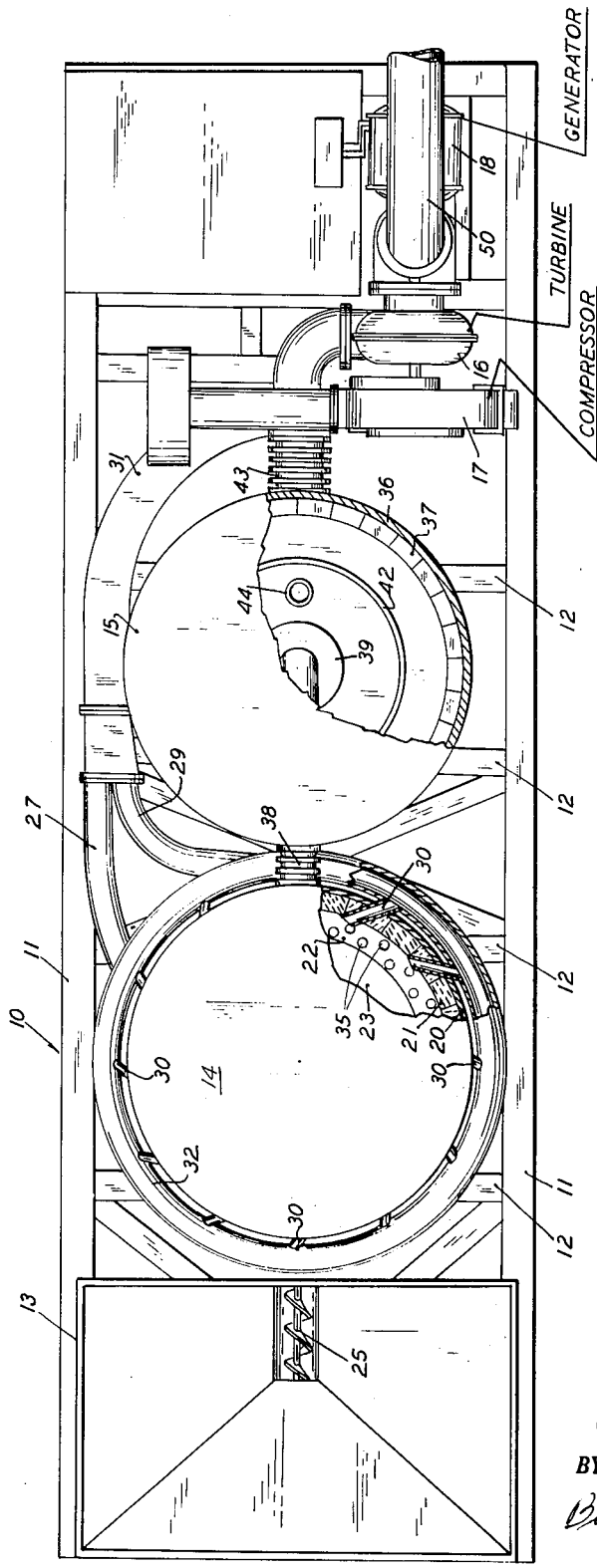
Fig. 2 is a top view, partly in section.

The embodiment of the invention illustrated in Figs. 1 and 2 includes a frame 10 having a pair of longitudinally extending beam members 11 which may be I-beams tied with a plurality of transverse beams 12 which may also be I-beams. Arranged on the frame are the units of the power plant of this invention which include a hopper 13 for receiving wood waste to be fed to a furnace or primary combustion chamber 14 for burning therein. Arranged in close proximity to the primary combustion chamber 14 is a secondary combustion chamber 15 which receives the gaseous products of primary chamber 14 and is adapted to aid the combustion of any combustible gases contained in said products. Driven by the gaseous products from secondary chamber 15 is a turbine 16 arranged to drive a compressor 17 for supplying air to the combustion chambers, the turbine 16 being also arranged to drive an electrical generator 18 from which electrical energy may be tapped.

The primary combustion chamber 14 may be of any desired cross-section but, inasmuch as the system operates under pressure, it is preferably formed of a conical domed, cylindrical steel shell 20, such structures being capable of withstanding considerable pressure, lined with a refractory brick 21 or other suitable refractory material.

Since conventional type grates will not permit the efficient combustion of a very fine fuel with a high moisture content, I have provided my system with a unique fuel supporting arrangement which gives superior results with such fuels and which comprises a plurality of grates arranged in a vertically spaced-apart relation and being of progressively smaller cross-section in the vertical direction. In the embodiments shown in Fig. 1, this fuel supporting arrangement comprises a horizontal grate 22, the edges of which are preferably substantially contiguous with the lining 21, with a circular feed or fuel distributing plate 23 of lesser diameter than the grate 22 supported thereabove and axially aligned therewith as by legs 24. The gate is formed with openings 35 to permit air to flow therethrough, as will be explained. Fuel is fed to the plate 23 from the hopper 13 by means of a screw type conveyor 25 driven by a motor 19, the conveyor leading up through the grate 22 and opening onto the plate 23. In operation of the furnace, fuel, which may be sawdust, hogged wood, and the like, is continually fed to plate 23 at a rate whereby it forms a conical pile 33 on plate 23 extending to the edges thereof, with a portion of the fuel continually overflowing onto grate 22 to form an annular pile 34 thereon, and at a rate equal to the rate at which the fuel is burned from the piles on the grate and the plate so as to continually maintain a supply of fuel. Feeding the fuel in this manner apparently allows it to preheat as it moves to the edge of the feed plate 23 so that it is more quickly raised to its combustion temperature when it reaches the actual burning area. Whatever the cause, it has been found that this form of grate makes possibe a heat release rate several times that possible with conventional "Dutch oven" grating systems. Inasmuch as the system operates under pressure, hopper 13 is provided with a lid 26 which may be sealed to prevent the blowback of gases from the furnace through the conveyor system. It has been found, however, that the conveyor elements and the fuel serve as an excellent gas seal for the system which operates under only two to three atmospheres of pressure. Any ashes accumulating in the space beneath grate 22 are removed through a door (not shown) provided in the walls of the chamber.

To maintain combustion, means are provided to supply air to the furnace both below and above the grate 22. In the embodiment shown, air is introduced directly below the grate 22 through a conduit 27, preferably being directed against a baffle 28 so as to distribute the air evenly below the grate. Additional air is also introduced to the primary chamber 14 above the grate 22 and preferably at several points about the periphery of the furnace through nozzles 30 which direct the air substantially tangentially of the walls. The nozzles 30 are tapped into a tuyere 32 fed by air conduit 29. The tangential introduction of the air imparts a swirling motion to the gases in the chamber which serves to help mix the air with the gases driven from the burning fuel and also increases the effective volume of the chamber since the circular motion imparted to the gases lengthens their path of travel through the chamber and consequently lengthens the period of time during which they are held therein. Both conduits 27 and 29 are connected to an air supply line 31 leading from a suitable source of air under pressure, in this case the compressor 17.

To obtain efficient utilization of wood as a fuel, it is necessary that some provision be made for permitting the combustion of the combustible gases that are always driven off when wood is burned. This requires that sufficient time and space be provided for these gases to be mixed with air at temperatures above their ignition point. In the present system some of the gases burn in the space above the grate 22 of the primary chamber 14; however, the velocity of the gas flow is so rapid through the primary chamber that not all of the gases could be burned therein without making the chamber unduly high and making it awkward to move. When it is desired to keep the combustion apparatus compact, there is provided in accordance with the present invention a secondary combustion chamber 15 adapted for the combustion of combustible gases derived from the primary chamber 14. The secondary chamber 15 may be formed of a pressure resisting, conical domed, cylindrical steel shell 36 lined with a suitable refractory 37, and is preferably located closely adjacent the primary chamber 14 so that the hot gases may be conducted from the latter chamber to chamber 15 without appreciable loss of heat by flue means such as conduit 38 insulated in a known manner, and introduced into chamber 15 above the ignition temperature of the combustible gases in the stream.

To increase the effective volume of the secondary chamber, it is preferably baffled to create a tortuous path for the gases passing therethrough. In the illustrated embodiment there is shown a preferred design of the chamber wherein the gases are first conducted to an axially aligned cylinder 39 closed at the top except for the opening for attachment to conduit 38, and open at the bottom. The cylinder 39 is supported as by legs 40 a distance above a supporting plate 41, thereby affording a path for the gases to flow outwardly from the cylinder and upwardly through the space defined by cylinder 39 and an annular wall 42 spaced intermediate the cylinder 39 and the lining 37 of the secondary chamber 15. The top of wall 42 is spaced a distance from the top of the secondary chamber so that the gases may flow over the top of the wall and downwardly between the wall and the sides of the secondary chamber, eventually being led from the secondary chamber and to the turbine 16 by a conduit 43.

Suitable means for introducing air into the secondary chamber 15 for combustion of the combustible gases therein are provided by air conduits 44 connected to the air supply line 31.

The baffle arrangement described above also aids in the capture of much of the flyash carried over in the gas stream from the primary combustion chamber so that the gases eventually used to drive the turbine have only very slight amounts of ash particles therein. The ash particles being carried downwardly in the gas stream in cylinder 39 have a much greater momentum, of course, than the gas particles, and thus tend to continue in a straight path toward the bottom of the chamber rather than to accompany the gases as they flow out of the cylinder 39 and into the space between it and the wall 42. Advantage is taken of this fact by providing an opening 51 in plate 41 beneath the cylinder 39 whereby the ash particles may enter the ash pit 45 defined by the plate 41 and the bottom portion of the chamber. By positioning a conical deflector 46 in the opening, the particles are deflected into the sides of the pit where the gases are in a relatively quiescent state and the particles can settle out. An opening (not shown) is provided to the ash pit in the walls of the secondary chamber so that access may be had for periodically cleaning it.

The combustion system just described is capable of supplying hot gases under pressure to a suitable heat engine. A particularly satisfactory form has been found to be an elastic fluid turbine diagrammatically illustrated in the drawings at 61. The turbine is preferably arranged to drive the air compressor 17 having an outlet to the air supply line 31 to supply gases under pressure to the primary and secondary combustion chambers. The turbine's power is conveniently utilized to drive an electrical generator 18 as shown, though of course it is apparent it could be arranged to be directly coupled to mechanically driven machinery. Exhaust gases from the turbine are conducted therefrom by conduit 50 and may be utilized as a source of heat for other operations, for example, in lumber drying kilns.

Figure 3:
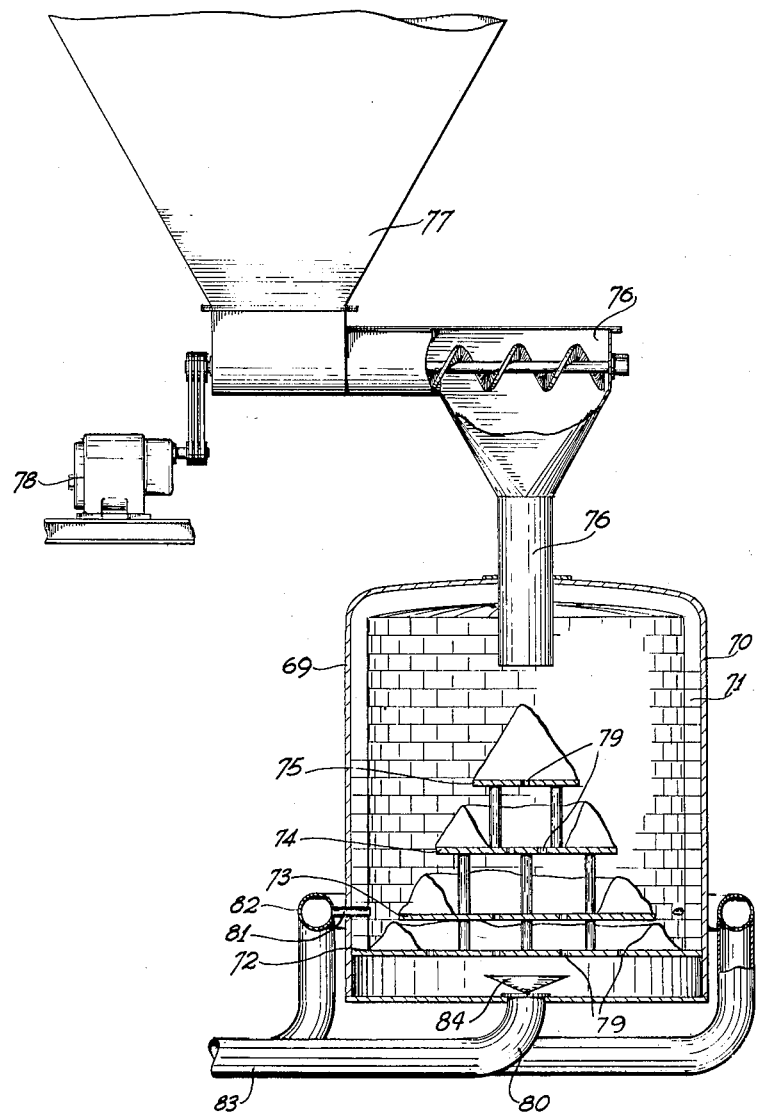
Fig. 3 is a side elevation of a modified form of the furnace of the present invention.

A modified form of the primary combustion chamber is shown in Fig. 3 to illustrate another form of the fuel distributing means. As shown, the combustion chamber 69 of this embodiment consists of an outer, pressure resisting, steel shell 70 lined with a suitable refractory material 71, with a grate 72 extending across the chamber near the bottom thereof. Arranged above the grate are a series of axially centered, circular, vertically spaced-apart fuel distributing plates 73, 74 and 75 of progressively smaller diameter in the vertical direction. In the arrangement shown, the grate 72 and the fuel distributing plates 73 and 74 are preferably formed with perforations 79 to allow better circulation of air to the fuel arranged on them. Fuel may be fed to the uppermost plate 75 through the top of the furnace such as by a worm-screw feed assembly 76 driven by a motor 78 and leading from a suitable hopper 77 having a suitably sealed lid (not shown). The fuel is fed at a rate whereby it will overflow from plate to plate progressively downwardly and finally to the grate at the rate of consumption thereon. An alternate and preferred form of feeding fuel is as shown in the embodiment of Figs. 1 and 2, that is, wherein fuel is fed to the uppermost plate through a conveyor tube leading up through the lower plates and opening onto the upper plate.

Means are provided to introduce air into the chamber 69 including a conduit 80 introducing air below the grate, a deflector 84 being arranged at the conduit mouth to distribute the air, and nozzles 81 tapped from a tuyere 82 for introducing air above the grate. The tuyere 82 and conduit 80 are supplied from a suitable source of air under pressure indicated here by line 83.

In an arrangement such as shown in Fig. 1, consuming 700 pounds of sawdust per hour having a moisture content of about 50 per cent, it is possible to obtain about 180 to 200 horsepower per hour at the generator; an overall efficiency of from 10 to 12 per cent is a very reasonable expectation. Such a system requires the combustion chamber to be operated at about a pressure of 30 pounds per square inch gauge.

The gas turbine power unit is adapted for mobility and, as illustrated, can easily be mounted on a single frame of moderate dimensions. It should be understood that principles of my invention are applicable in building power units of large power producing capacity, and that the combustion chamber and complementary units can be installed as permanent, nonmobile units.

Having illustrated and described a preferred embodiment of the invention, it should be apparent to those skilled in the art that the invention permits of modification in arrangement and detail. I claim as my invention all such modifications as come within the true spirit and scope of the appended claim.

I claim:

Combustion apparatus for use in conjunction with a heat engine to obtain useful energy from the combustion of wood refuse such as sawdust and the like, comprising a structure forming a primary combustion chamber, a horizontally disposed grate within said chamber, a plurality of horizontally disposed fuel distributing plates in said chamber disposed in a vertically spaced-apart arrangement above said grate, said plates being of progressively smaller area in the vertical direction, whereby an excess of refuse fed onto the upermost plate will progressively fall from plate to plate and subsequently to said grate, means for feeding said wood refuse onto the uppermost of said plates at a rate whereby a supply of refuse will continually be supplied to successively lower plates and to said grate, means for introducing air to said primary chamber beneath said grate, means for introducing air to said chamber above said grate, a structure forming a secondary combustion chamber, flue means communicating with said chambers for transporting the gaseous products of combustion formed in said primary chamber to said secondary chamber, means within said secondary chamber defining a tortuous path for said gases whereby to lengthen the path of travel of said gases through said secondary chamber, means for introducing air to said secondary chamber to complete the combustion of combustible gases contained in the gaseous products of said primary combustion chamber, and means for conducting the gaseous products of combustion from said secondary chamber.

References Cited in the file of this patent

UNITED STATES PATENTS

| | | |
|---|---|---|
| 220,017 | Fell | Sept. 30, 1879 |
| 691,328 | Smead | Jan. 14, 1902 |
| 717,634 | Smead | Jan. 6, 1903 |
| 730,782 | Morrison | June 9, 1903 |
| 985,793 | Fabel | Mar. 7, 1911 |
| 1,015,549 | Foersterling | Jan. 23, 1912 |
| 1,541,648 | Martin | June 9, 1925 |
| 1,673,668 | Erion et al. | June 12, 1928 |
| 1,957,921 | White | May 8, 1934 |
| 2,139,760 | Losche | Dec. 13, 1938 |
| 2,171,535 | Berg et al. | Sept. 5, 1939 |
| 2,225,311 | Lysholm | Dec. 17, 1940 |
| 2,488,969 | Dietler | Nov. 22, 1949 |
| 2,496,407 | Pfenninger | Feb. 7, 1950 |
| 2,505,363 | Nichols | Apr. 25, 1950 |

FOREIGN PATENTS

| | | |
|---|---|---|
| 391,315 | France | Aug. 26, 1908 |
| 379,425 | Germany | Aug. 22, 1923 |